(12) United States Patent
Fujita et al.

(10) Patent No.: US 11,647,315 B2
(45) Date of Patent: May 9, 2023

(54) OPTICAL ROUTING SYSTEM FOR FREE SPACE OPTICAL COMMUNICATION

(71) Applicant: SCIDATEK INC., Austin, TX (US)

(72) Inventors: Junichiro Fujita, Los Altos, CA (US); Tomoyuki Izuhara, Pleasanton, CA (US); Louay Eldada, Austin, TX (US)

(73) Assignee: SCIDATEK INC., Austin, TX (US)

( * ) Notice: Subject to any disclaimer, the term of this patent is extended or adjusted under 35 U.S.C. 154(b) by 0 days.

(21) Appl. No.: 17/483,414

(22) Filed: Sep. 23, 2021

(65) Prior Publication Data
US 2023/0091416 A1    Mar. 23, 2023

(51) Int. Cl.
  *H04B 10/112*    (2013.01)
  *H04Q 11/00*    (2006.01)

(52) U.S. Cl.
  CPC ..... *H04Q 11/0067* (2013.01); *H04Q 11/0005* (2013.01); *H04Q 2011/009* (2013.01); *H04Q 2011/0018* (2013.01); *H04Q 2011/0073* (2013.01); *H04Q 2011/0088* (2013.01)

(58) Field of Classification Search
  CPC .. H04Q 11/0067; H04B 10/112; H04B 10/114
  See application file for complete search history.

(56) References Cited

U.S. PATENT DOCUMENTS

| | | | |
|---|---|---|---|
| 5,592,320 A * | 1/1997 | Wissinger | H04B 10/118 398/121 |
| 6,323,980 B1 * | 11/2001 | Bloom | H04W 88/085 398/116 |
| 6,366,379 B1 * | 4/2002 | Terahara | H04J 14/0213 398/83 |
| 7,376,295 B2 | 5/2008 | Lee et al. | |
| 7,751,716 B2 | 7/2010 | Killinger | |
| 8,548,332 B2 | 10/2013 | Schmitt | |
| 9,042,734 B2 | 5/2015 | Makowski et al. | |
| 9,270,372 B2 | 2/2016 | Miniscalco | |
| 9,438,337 B2 | 9/2016 | Byers | |
| 9,729,234 B2 | 8/2017 | Lambert | |
| 10,090,959 B2 | 10/2018 | Lambert | |
| 10,924,183 B2 | 2/2021 | Gupta et al. | |
| 2002/0012139 A1 * | 1/2002 | Willebrand | H04B 10/1149 398/118 |
| 2014/0016932 A1 * | 1/2014 | Coleman | H04B 7/18515 398/43 |
| 2014/0294399 A1 * | 10/2014 | Makowski | H04B 10/118 398/126 |

(Continued)

OTHER PUBLICATIONS

Dodley et al., "Free-space optical technology and distribution architecture for broadband metro and local services", Proceedings of SPIE 4214, Feb. 2001 (Year: 2001).*

*Primary Examiner* — Shi K Li
(74) *Attorney, Agent, or Firm* — Pierson IP, PLLC (57) ABSTRACT

An optical routing system for free space optical communication is disclosed. The system has a transmitter and a receiver that use free space optical communication, and includes an optical path based on waveguide where an optical signal is routed from the proximity of the transmitter to the proximity of the destination. This system has advantages in terms of mitigating line-of-sight issues, as well as potentially reducing the overall coupling loss that would be otherwise incurred due to beam divergence of free space propagation for long distance.

8 Claims, 9 Drawing Sheets

(56) References Cited

U.S. PATENT DOCUMENTS

2016/0021612 A1\* 1/2016 Matsunaga ....... H04W 52/0209
370/311
2022/0283387 A1\* 9/2022 Rusu ....................... H01L 25/18

\* cited by examiner

OPTICAL ROUTING SYSTEM FOR FREE SPACE OPTICAL COMMUNICATION

FIELD OF THE INVENTION

Embodiments generally relate to an optical relay device where free space optical signals can be routed.

BACKGROUND OF THE INVENTION

Recent advances in wireless technology enable access to internet communication almost everywhere. With the current deployment of wireless technology such as 5G (5th generation cellular networks), data rates on the order of 1 gigabit per second (Gbps) are already available. As a result, new wireless applications that require communications with vast amounts of data have emerged. These include outdoor applications such as viewing live music/sports events, connected cars and security, and indoor applications such as virtual reality, industry 4.0, and video streaming with high resolution TV's.

At the same time, the demand for even higher communication speed is expected. Wireless technology has been at least partially relying on higher frequency (shorter wavelength) for faster communication. However, as the frequency of signals becomes higher, transmitting the signals through opaque objects such as building structures (including walls and even windows) becomes an increasingly larger issue.

In the realm of optical communication, free space optical communication (FSO) has been mostly deployed for long distance such as satellite communications. Recently, this technology has been explored in relatively short distance applications as an alternative to fiber optic communications and existing radio frequency (RF) communications. FSO has an advantage over existing RF communications for potentially higher data rate of 10's or 100's of Gbps at a single wavelength channel, in addition to the ability to operate in unregulated frequency bands as IR communication is not subject to regulation. FSO has the advantage over fiber optic communications in terms of having no physical connection or transmission medium installation. Having no physical connection also means that a communication device can be moved more freely and can be a mobile device.

FSO typically uses wavelengths ranging from the visible spectrum to the infrared spectrum. At this wavelength range, the line-of-sight issue is more critical than in the case of the RF counterpart. The line-of-sight issue refers to the presence of a physical blocking object in the direct path between the transmitting and the receiving sites. The optical signals, having shorter wavelengths, suffer power loss due to absorption and/or reflection at the physical blocking object and, in most cases, lose the connection due to the lack of a line-of-sight connection.

One common approach to mitigate the line-of-sight issue is to create a non-direct path between the transmitting and receiving sites. There are prior art publications teaching the methods. Byers (U.S. Pat. No. 9,438,337) proposed multi-beam free space optical devices. Using a plurality of such devices can generate possible indirect paths. However, these devices require optical-to-electrical and electrical-to-optical conversions. Such conversions, especially at data rates above 1 Gbps, are costly and have high power consumption. Gupta (U.S. Ser. No. 10/924,183), Killinger (U.S. Pat. No. 7,751,716), and Schmitt (U.S. Pat. No. 8,548,332) described the use of a reflective medium such as a mirror to create a path between the two sites. Lambert (U.S. Pat. No. 9,729,234 and U.S. Ser. No. 10/090,959) taught the use of a bent pipe channel for satellite communications to establish an indirect path. Makowski (U.S. Pat. No. 9,042,734) and Miniscalco (U.S. Pat. No. 9,270,372) described mesh networks to create multiple optical paths so that an alternative path can be established in case the direct path is not available. Although these methods will create alternative paths in case of a line-of-sight issue, the optical path length will be longer than the case of the direct path. This leads to additional loss in optical power or signal strength as optical beams have divergence angles that lead to additional coupling loss at the detector of the receiving site when the transmission path is longer.

The line-of-sight issue is not a problem for fiber optic communication or waveguide optics because the optical signal is always physically confined within a guiding material. For example, optical routing on circuit boards has been done, with the technology termed optical interconnect. Lee (U.S. Pat. No. 7,376,295) described optical routing within a combination of waveguides and fibers. There are small portions of free-space beam propagation from the output of a laser to the input of a waveguide as well as the output of a waveguide to the surface of a photodiode. The purpose of free space propagation is for the transition between two dissimilar materials. A large free space region generally translates into large loss and is considered undesirable. However, this structure does not serve the purpose of FSO as the transmitter and receiver are physically fixed.

Accordingly, needs exists for systems and methods that include multiple nodes where the propagation of an optical beam changes between free space and waveguiding material around a physical blocking object.

SUMMARY

The embodiments in the present invention describe an optical routing system in free space optical communication (FSO) to establish an alternative optical path in case the line-of-sight path is blocked, without the use of costly, lossy and high-power-consumption optical-to-electrical conversion. It includes of multiple nodes where the propagation of an optical beam changes between free space and waveguiding material (e.g., optical fiber, planar waveguide). The guided signal is routed from one node to the other through one or multiple optical switches. The optical path of an optical switch is established by applying a radio frequency (RF) signal or optical signal into the optical switch. The free-space optical beam from a transmitter is coupled to a first node and is directed through at least one optical switch to a second node where the optical signal is converted back to a free-space optical beam and propagates to the receiver.

BRIEF DESCRIPTION OF THE DRAWINGS

The following drawings are illustrative of embodiments of the present embodiments and are not intended to limit the embodiments as encompassed by the claims forming part of the application.

The schematic diagram of FIG. 1 shows the approaches of some prior art disclosures for overcoming line-of-sight blockage by an opaque object located in the direct path between a transmitter and a receiver.

The schematic diagram of FIG. 2 shows an example of the case when the prior art approach in FIG. 1 may not work.

The schematic diagram of FIG. 3 shows one embodiment of the present invention's optical routing device based on photonic integrated circuitry.

The schematic diagram of FIG. 4 shows a method of controlling the switching state based on a wireless RF signal from the transmitter.

The schematic diagram of FIG. 5 shows another method of controlling the switching state based on an optical routing signal transmitted from the transmitter.

The schematic diagram of FIG. 6 shows another implementation of the optical routing device based on fiber collimators with actuators (each comprising a motion stage and a motion controller) as the elements for coupling optical signals between free space beams and waveguides.

The schematic diagram of FIG. 7 shows an example of the actuator design at the fiber collimators on the transmitter side and the receiver side.

The schematic diagram of FIG. 8 shows an optical routing device where optical switches are connected together through waveguide means.

The schematic diagram of FIG. 9 shows an optical routing device where an optical transceiver is connected with one of the optical switches.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present embodiments are related to an optical routing system used for free space optical communication. It should be noted that the optical routing system of the present embodiments is defined as a passive system and does not perform signal generation through optical-to-electrical or electrical-to-optical conversion. Throughout the description, the words "transmitter" and "receiver" are used for describing the direction of the optical signal and not for limiting the functionality. For example, transmitter and receiver can be part of transceivers.

Figure 1:
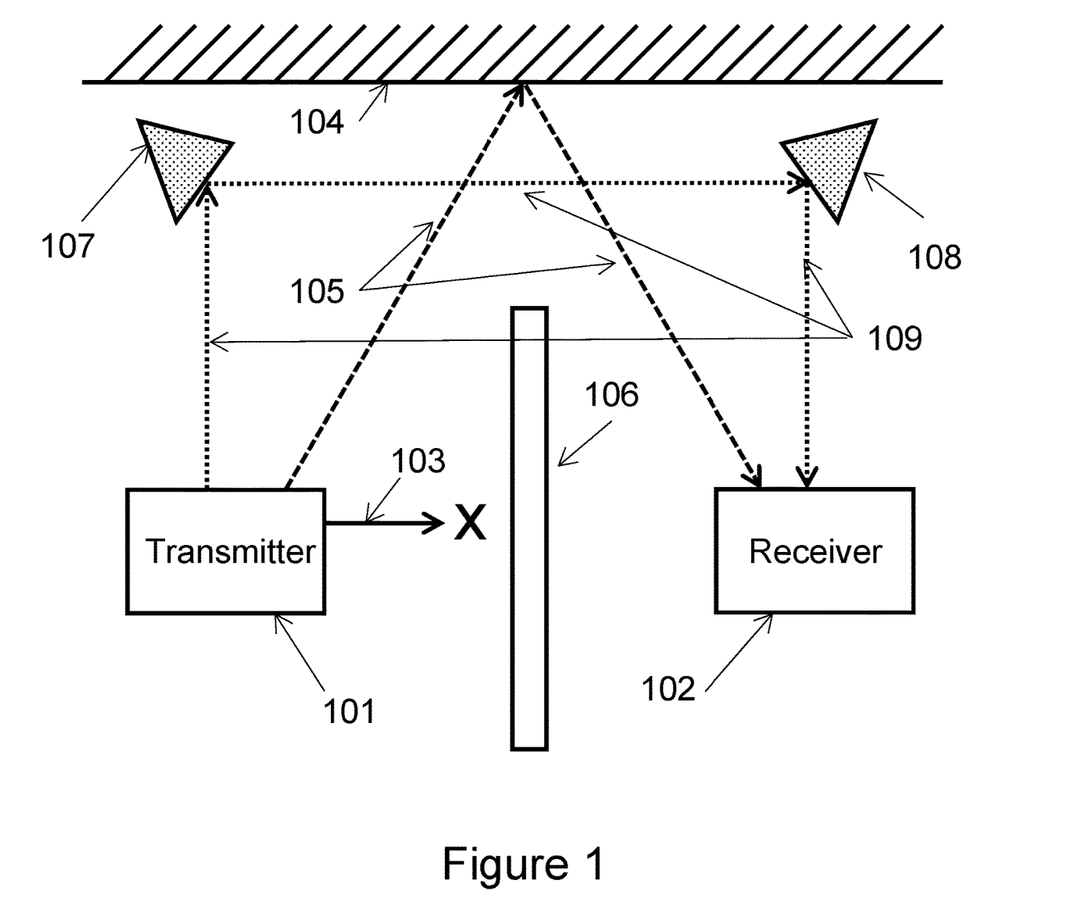

Unlike the case of RF counterparts, optical beams have strong directivity and are blocked by opaque objects. The latter issue is called a line-of-sight issue and its mitigation has been discussed by several groups in the technical community. One case described in several prior art publications is the case of an opaque object, as shown in FIG. 1, that blocks an optical signal if a transmitter, 101, and a receiver, 102, attempt to communicate at the direct path, 103. Gupta (U.S. Ser. No. 10/924,183), Killinger (U.S. Pat. No. 7,751,716), and Schmitt (U.S. Pat. No. 8,548,332) used a reflective medium 104 to reflect the optical beam shown as 105 to direct it to the receiver 102 without being affected by the blocking object, 106. Lambert (U.S. Pat. No. 9,729,234 and U.S. Ser. No. 10/090,959), Makowski, (U.S. Pat. No. 9,042,734) and Miniscalco (U.S. Pat. No. 9,270,372) described a mesh network to create an optical path among the nodes, 107 and 108, in the network to route, as shown in 109, to the receiver 102.

Figure 2:
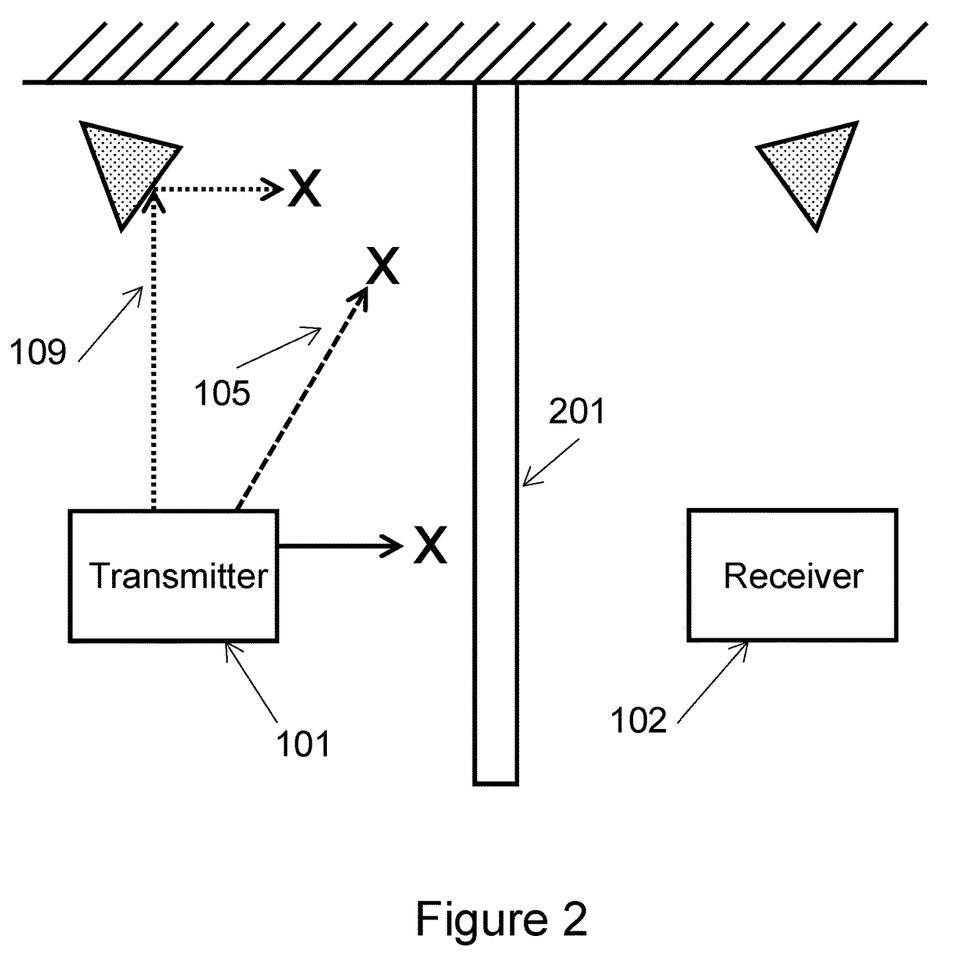

However, there are cases where the prior art proposed solutions cannot create an optical path. One example is the case, as shown in FIG. 2, where a transmitter, 101, and a receiver, 102, are in different rooms with a solid wall, 201, in between. In such a situation, it is difficult to design an optical path just with free space.

Figure 3:
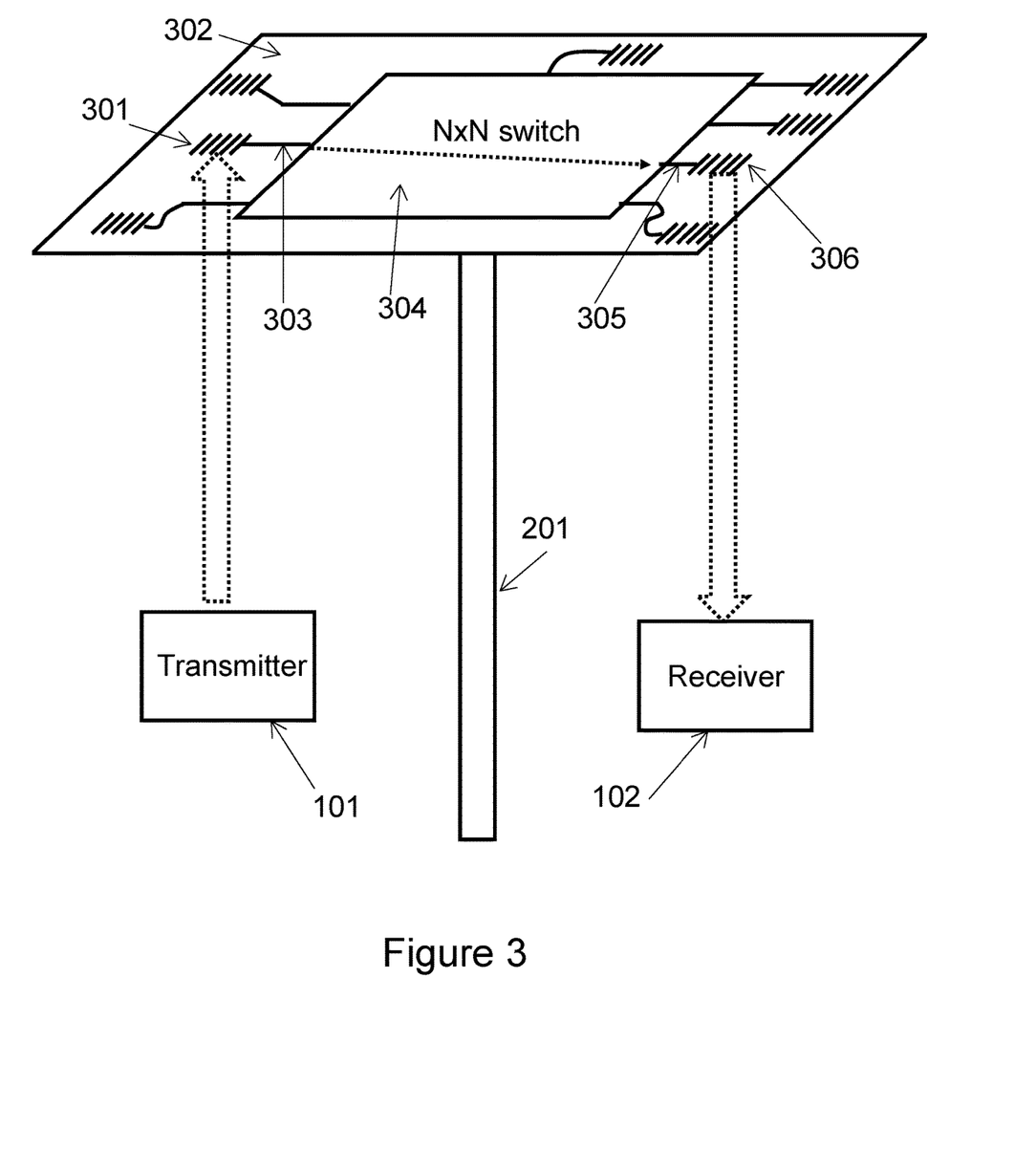

A novel optical routing system described herein includes a waveguiding structure where an optical beam can be coupled and routed around a blocking opaque object, such as solid wall 201. The resulting optical signal is emitted from the waveguide at a location in the proximity of the receiver and with a clear free-space path to it. One example of such a structure is a ceiling with waveguides that run over a solid wall 201 as depicted in FIG. 3, wherein a first side of the waveguide is positioned in a room on a first side of the solid wall 201 and a second side of the waveguide is positioned on in a room on a second side of the solid wall 201. This system requires openings at the locations where the optical beam is coupled into and emitted from the waveguiding structure without the line-of-sight issue. It allows the optical signal to reach the receiver for the case of a structure such as a solid wall, 201, as the optical signal is guided above, and around, the blocking structure. Furthermore, the signal propagation within a waveguide maintains the beam size so that the potential coupling loss of the optical beam into the receiver due to the divergence angle can be reduced.

In an embodiment, a transmitter 101 sends an optical signal to one of the available nodes or coupling devices, 301, positioned in a room formed on a first side of solid wall 201 within at least one photonic integrated circuit (PIC), 302. PICs include of chip-based waveguides for routing as well as performing device functionalities such as optical switches, splitters, and couplers within a substrate. The node couples the optical beam from an out-of-plane direction into a waveguide and can be, for example, a grating coupler or angled mirror. A lens can be added in front of such a structure for focusing the free-space beam to enhance the coupling efficiency. The coupled signal propagates within a waveguide, 303, into an N×N switch, 304, where the path of the optical signal is selected. The optical signal at the output of the N×N switch, 304, is guided, 305, to a different node or coupling device, 306, positioned in a room formed on a second side of solid wall 201 where the guided signal is directed into free space as an out-of-plane beam. As such PIC 302 may have at least a first coupling device 301 positioned in a first chamber, room, etc. with a boundary formed by blocking object 201, and a second coupling device 306 positioned in a second chamber, room, etc. with a boundary formed by blocking object 201. At least a part of the beam is collected by the receiver 102.

Figure 4:
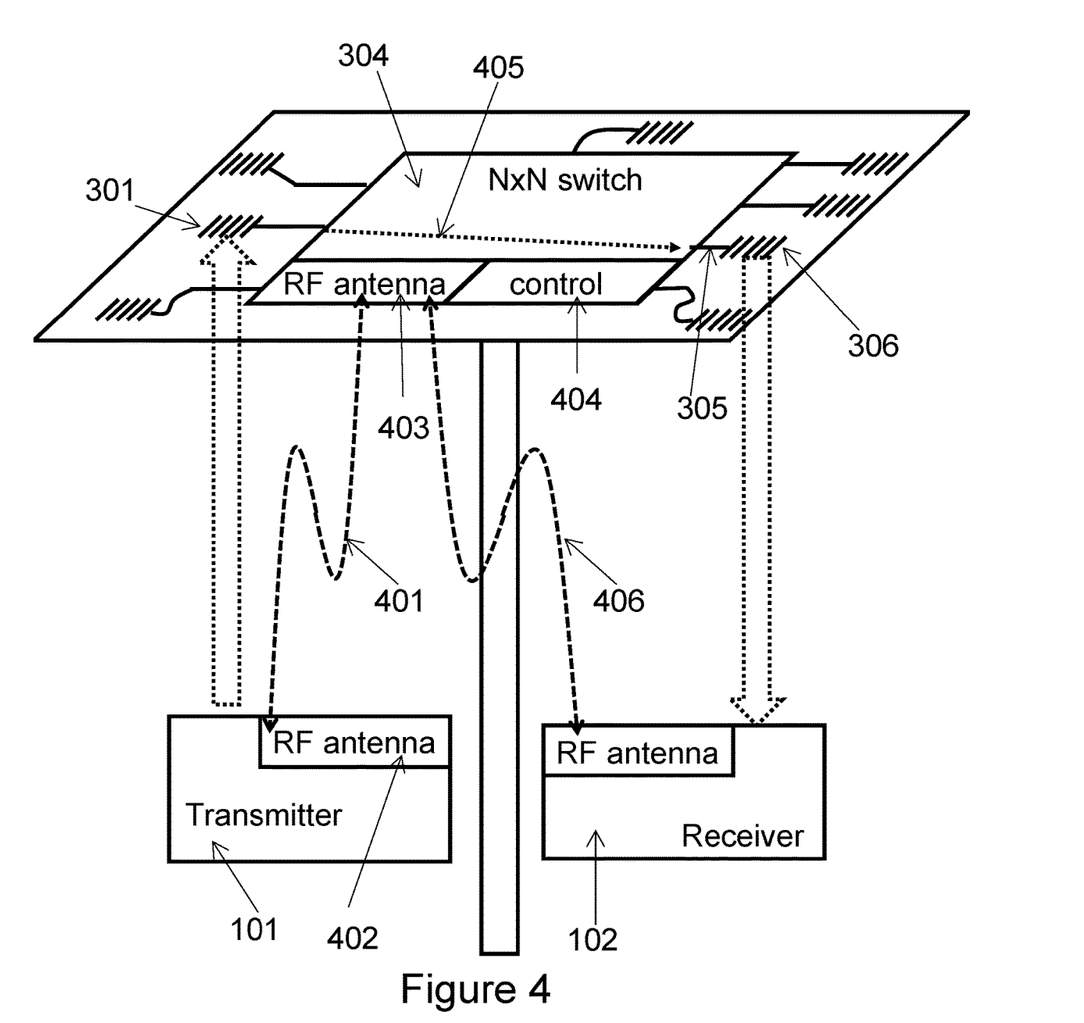

One way of determining the setting the state of the N×N switch is, as depicted in FIG. 4, to send an RF signal, 401, from the antenna element, 402, of the transmitter, 101, to the antenna element, 403, of the optical switch, 304. The RF technology used here can be based on existing technology which may not provide as fast a data rate as the optical counterpart, but has the ability to communicate among the antenna elements. The RF signal received at the antenna, 403, of the N×N switch, 304, is converted into an electrical signal and processed by the switch control, 404, also located at the N×N switch, 304. The switch control, 404, having the information about which coupling device to be used for emitting the optical signal to the receiver, generates the switching state, 405. If the attempted switching state was not successful, such as in the case of insufficient optical power received from the coupling device to the receiver, it communicates with the receiver using RF signals, 406, generates all possible switching states and determines the best switching state (or routing path) among all possible options by measuring the optical power originating from the transmitter, 101, at the receiver, 102. The switching state that has been determined by this process can be stored by the switch control, 404, for future use.

Figure 5:
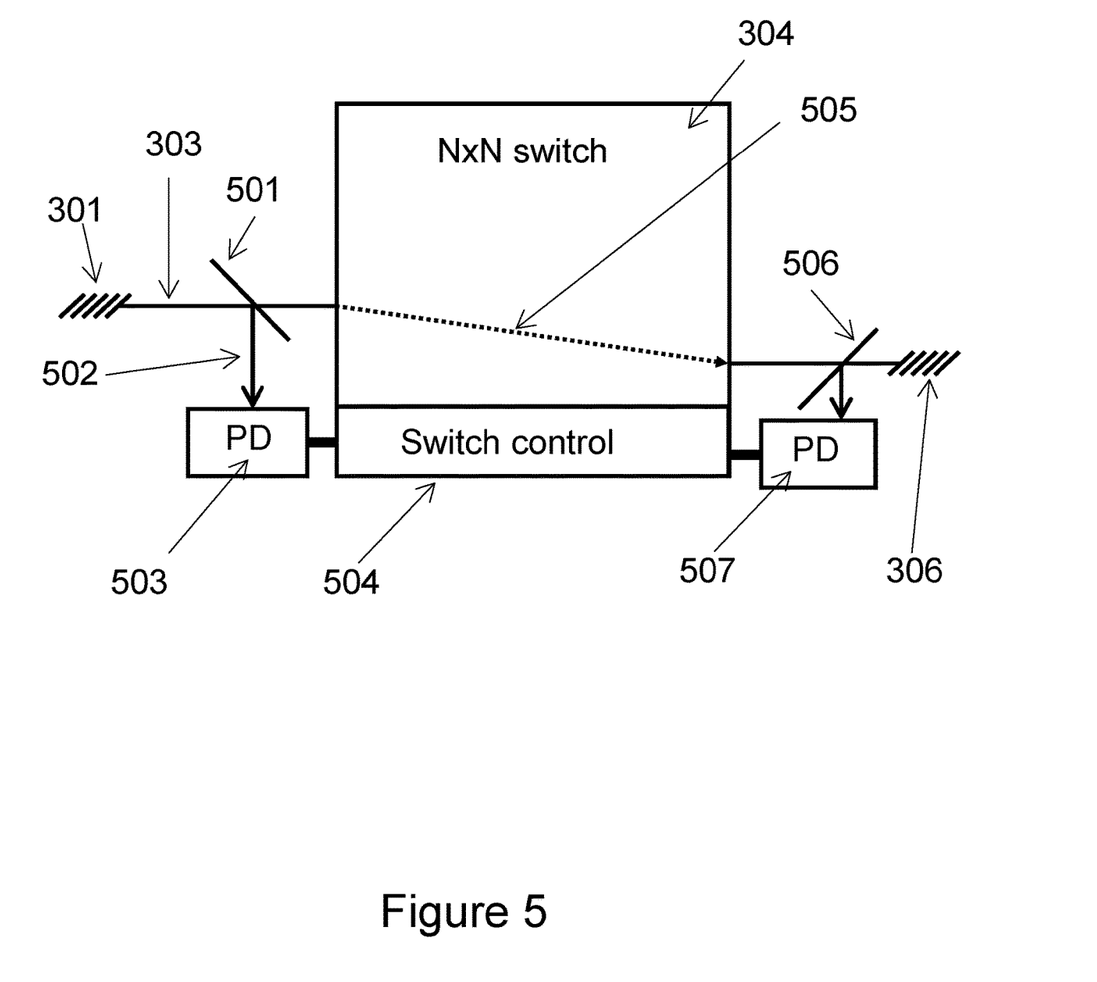

Another way of determining the switching state of the N×N switch is to send an optical routing signal along with the optical data signal, as depicted in FIG. 5. The optical routing signal carries the information about the nodes that cover the transmitter 101 as well as the receiver 102 while the optical data signal carries the data to be sent from the transmitter 101 to the receiver 102.

First, the optical routing signal propagates into the coupling device, 301, and is coupled within the waveguide, 303. The optical signal is split at the power splitter, 501. The purpose of the power splitter 501 is to take a portion of the power of the optical signal, 502, propagating into a photodiode, 503, for the conversion into an electrical signal so that the switch control, 504, located within the N×N switch, 304, reads the received electrical signal and configures the switching state, 505, accordingly. The information about mapping the coupling device for a receiver can be determined prior to the actual data transfer. At the initialization process, a receiver can send an optical alignment signal which can be captured by a coupling device. The optical alignment signal propagates to a power splitter, 506, where a portion of the power is directed to a photodiode, 507 for the detection.

Although the power splitter, 501, is described as a device taking a portion of the optical power to direct it into a photodiode, 503, it can also be a spectral filter if the wavelength of the optical routing signal is different from the wavelength of the optical data so that the spectral filter can direct each signal down its intended path, yet both wavelengths (or wavelength channels or wavelength bands) are close enough for the coupling device to be operated at both wavelengths. Once the routing signal is received at the optical switch and it determines the path, the optical data signal that propagates through the coupling device, 301, the waveguide, 303, and the power splitter, 501, is routed through the N×N switch with the defined path. The optical signal then goes through another power splitter, 506, and is directed to a coupler, 306.

Although not specifically described here, the N×N switch is preferably non-blocking so that multiple optical signals coming from different nodes can be routed to their respective destination nodes at the same time without disrupting any path connection. Furthermore, a 1×1 switch (or ON/OFF switch) can be added to any of the inputs or outputs of the N×N switch so that unintended optical noise can be blocked. For example, with the power splitter design of FIG. 5, a portion of the optical routing signal will be routed to the N×N switch. A 1×1 switch located at the input of the N×N switch will ensure that the optical routing signal will be blocked so that it won't be inadvertently read by any of the terminal devices.

It should also be noted that a power splitter or optical switch can be designed with an optical component containing free-space optics. Having free space portion within the waveguiding section may look contradictory to the present invention. However, the purpose of having the free space optics is to achieve the functionality of an elemental device and is not to route an optical signal. Therefore, it should still be treated as a waveguided device as long as the input and the output of such a device are based on waveguiding means such as waveguides on planar substrates or optical fibers.

The network architecture described in FIG. 3 is differentiated from the node of a relay device described by Lambert (U.S. Pat. No. 9,729,234 and U.S. Ser. No. 10/090,959). One difference is that the waveguide described in the present embodiments physically carries the optical signals from the originating coupler, 301, to the destination coupler, 306, as depicted in FIG. 3, which are positioned within different chambers on opposite sides of solid object 201. As long as there is no line-of-sight issue, the present embodiments carry the optical signal to the destination coupler, 306, located at the closest proximity to the receiver, 102, so that the distance of the free-space propagation from the destination coupler to the receiver is minimized. Another difference is that this invention has more flexibility in terms of expanding the network. Lambert's approach has a limited number of targets (either transmitter or receiver) because it only has a limited number of apertures where the optical beams are transmitted and received. In the present embodiments, the number of transmitters and receivers that are accessed simultaneously within the network can be as many as the number of optical couplers.

Figure 6:
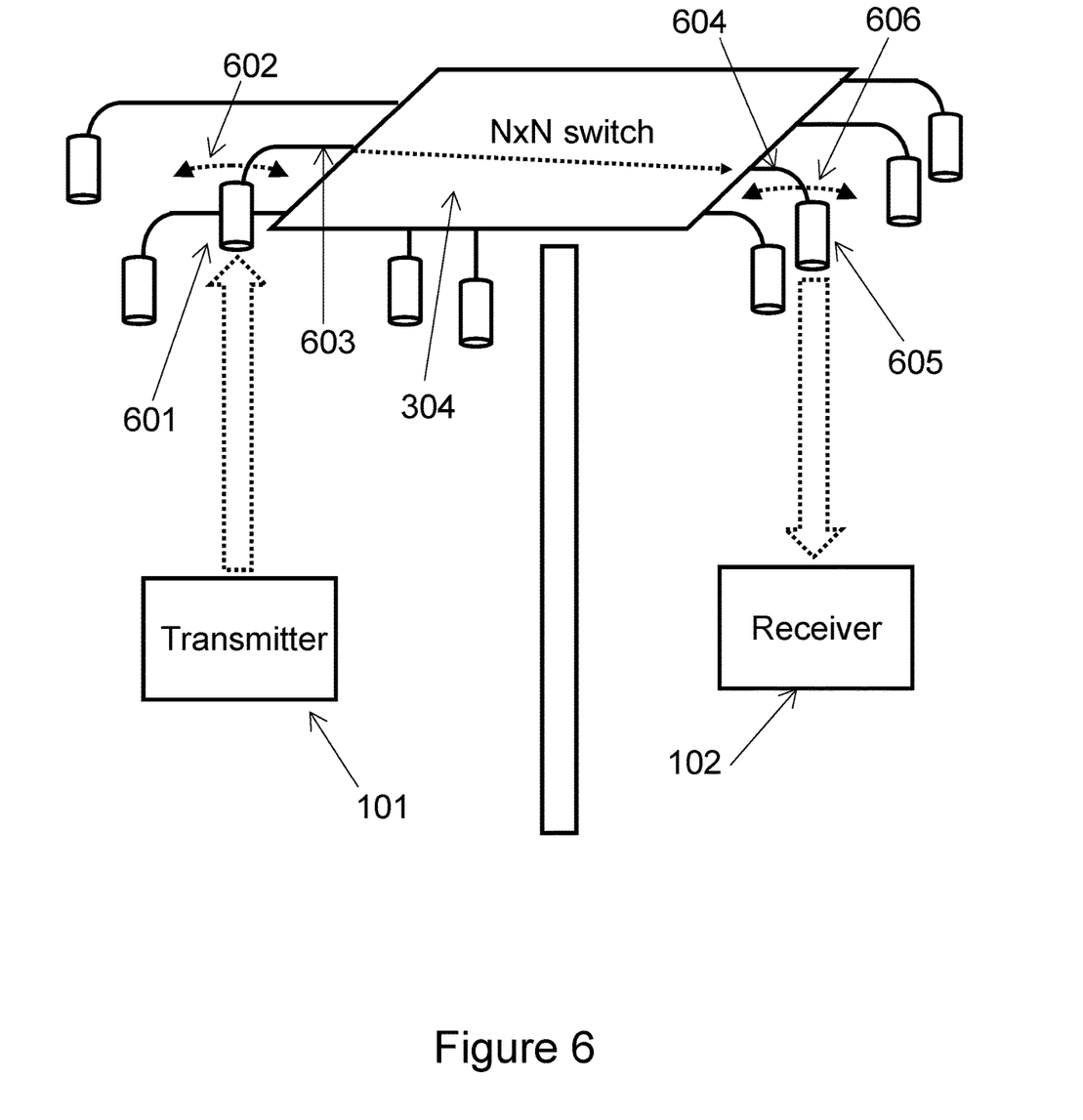

Another embodiment is depicted in FIG. 6. This optical routing system replaces the coupling device of a node in FIG. 3 with a fiber collimator, 601. Furthermore, the fiber collimator may be attached to an actuator, 602, so that the optical beam coming from a transmitter, 101, can be optimally aligned to the opening aperture of the fiber collimator. Actuator 602 may include a motion stage and a motion controller, wherein the motion stage is configured to move the actuator 602 in multiple axis, and allow rotation of actuator 602 via a motion controller. The optical signal is waveguided through a fiber, 603, into the N×N switch, 304. The output of the N×N switch, 304, is routed through a fiber, 604 around a physical object, to a steerable fiber collimator, 605, which converts the waveguided light carrying the optical signal into a free space beam and directs it to the receiver, 102.

In FIG. 6, the optical signal within the fiber, 603, is directly coupled to the N×N switch. The scope of embodiments is that the optical signal propagates within waveguiding medium and is not limited to the medium of the waveguide or a junctional location of dissimilar waveguiding media.

The fiber collimators, 601 and 605, can be static and designed to have divergence angles optimized to cover the area that the optical signals can access. However, it is desirable for many indoor applications to use a relatively small (~0.1 deg or less) divergence angle to reduce the beam size at the receiver. For the case of indoor applications, a typical propagation within free space is in on the order of meters. The beam size in 1 meter propagation at a divergence angle of 0.1 degree is already on the order of millimeters and is already larger than the active area of a ~10 Gbps detector.

Figure 7:
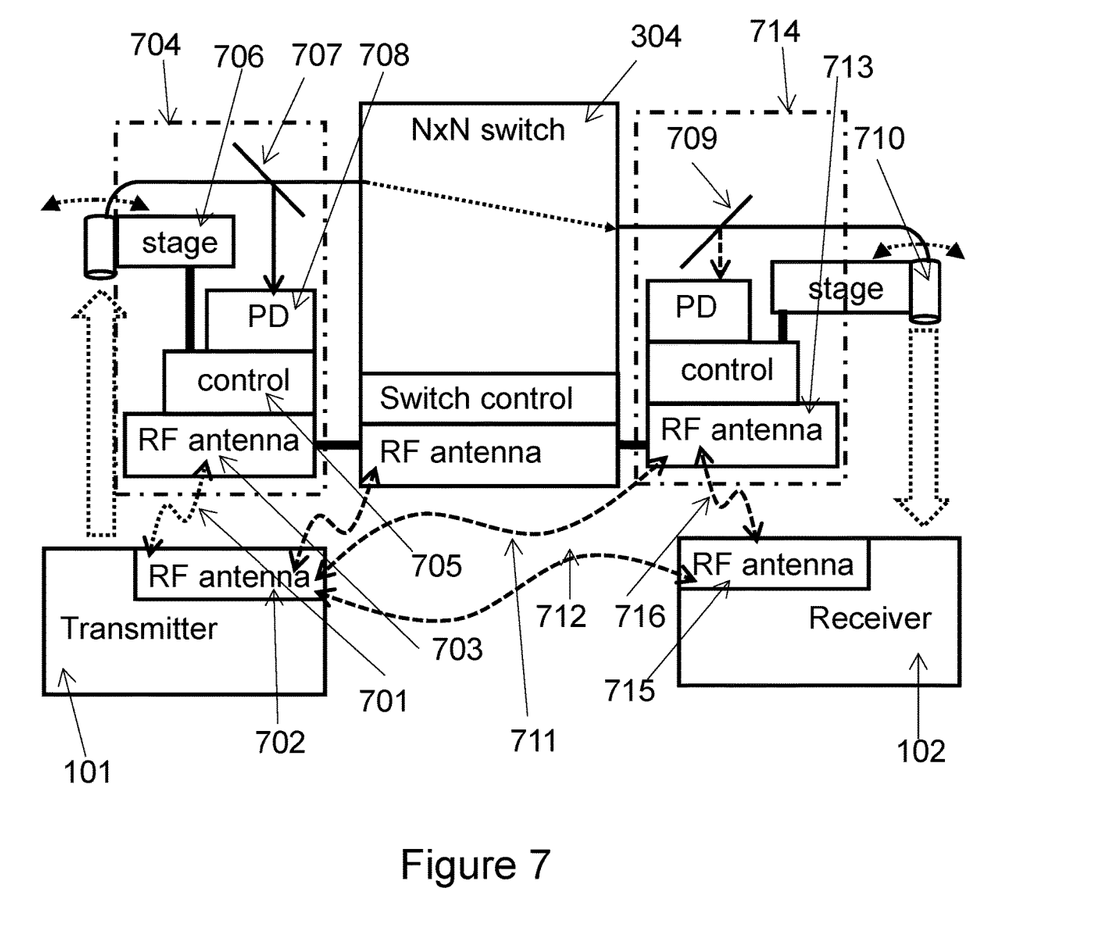

In order to reduce the overall coupling loss, beam alignment between a transmitter or a receiver and the related fiber collimator is desirable. The use of actuators, 602 and 606, at the fiber collimators, 601 and 605, optimizes the coupling efficiency, enables the use of lower divergence angle for the fiber collimators, and provides more tolerance in terms of the power loss budget. One way of controlling the actuators, 602 and 606, in FIG. 6 is to use RF communication signals as depicted in FIG. 7. Similar to the case of controlling the switching state, the RF signal, 701, sent from the antenna, 702, of the transmitter, 101, is received by the antenna, 703, of the actuator module, 704. The received RF signal is converted into an electrical signal and processed by the actuator control, 705 which determines the movement of the stage, 706. The optical power based on the movement of the stage, 706, is measured by using a power splitter, 707, to take a portion of the optical power, and a photodiode (PD), 708, to measure the optical power, and feedback to the actuator control, 705. The power splitter can be an optical filter to preferably take the optical alignment signal into the PD, 708. The power splitter, 707, can also be an optical switch so that, within the time of the alignment of fiber collimator, the optical switch directs the optical signal into the PD, 708, while it directs the optical signal to the N×N switch, 304, for the data transport.

One example of aligning the fiber collimator located at the receiver side is based on using the optical signal from the transmitter side. The optical signal coming out of the N×N switch, 304, is guided through the power splitter, 709, and reaches the fiber collimator, 710. The power splitter, 709, is designed to split the optical signal originating from the receiver, 102, when it is used as a transmitter for communication in the opposite direction, and is not designed to be used for the case of the optical signal originating from the transmitter, 101. The transmitter, 101, sends the RF signals, 711 and 712 to both the antenna, 713, of the actuator, 714, and the antenna, 715, of the receiver, 102, and initiates the alignment between the fiber collimator and the receiver. While the optical signal is transmitted, the actuator initiates the alignment of the stage. Similar to the case of the actuator, 704, at the transmitter side, alignment is achieved by finding out the position of the stage where the optical power at the receiver is maximized. During the alignment process, the received optical power at the receiver, 102, is monitored and feedback is sent to the actuator, 714, through the RF signal, 716.

The present embodiments do not limit the number of N×N switches or the corresponding number of optical couplers within the entire architecture. For example, a large scale (large number "N") switch can be an issue in terms of the device size and the cost. It is not necessary to match the number "N" to the number of the free-space-to-waveguide couplers. Instead, multiple smaller switches, where each switch can have a different number of ports, can be connected through a waveguide mean so that all couplers are connected to at least one of the switches without having a single large-scale N×N switch. One example is the use of 2N of 1×N switches to replace one N×N switch.

Figure 8:
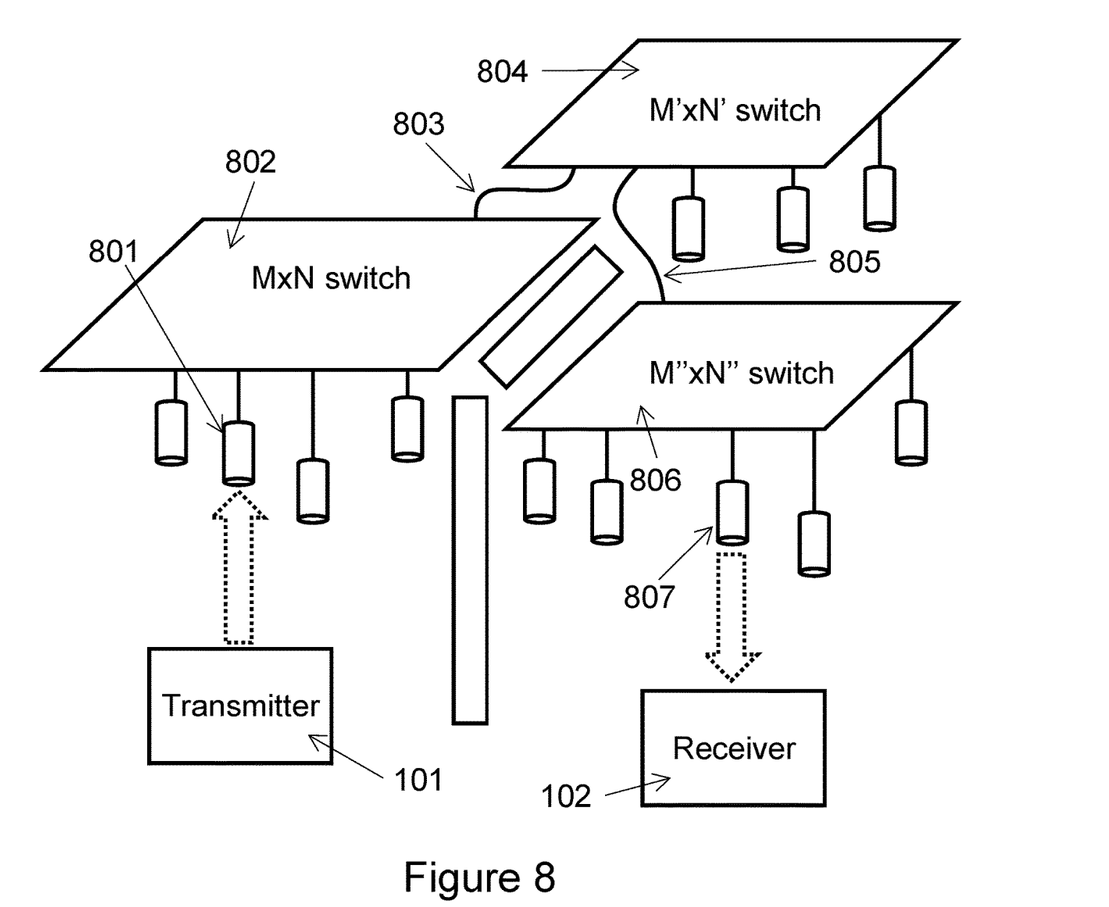

If a group of couplers is physically separated from another group of couplers, it is easier to design optical switches corresponding to the respective groups of couplers and connecting with other optical switches through a waveguide mean. FIG. 8 shows the architecture with cascaded M×N (M'×N', M"×N", etc.) switches. This architecture does not allow access from the transmitter, 101, to the receiver, 102, with a single optical switch, 802, alone. However, the optical signal of the transmitter, 101, can be routed through multiple optical switches to access the receiver, 102. The optical switches can be controlled using the method explained in FIG. 4 and FIG. 5. The optical signal is routed from the transmitter, 101, to the fiber collimator, 801, located in the proximity of the transmitter, 101. The optical signal is routed through a series of switches, 802, 804, 806, through the fibers, 803, 805, connected between the switches to reach the fiber collimator, 807, in the proximity of the receiver, 102.

Figure 9:
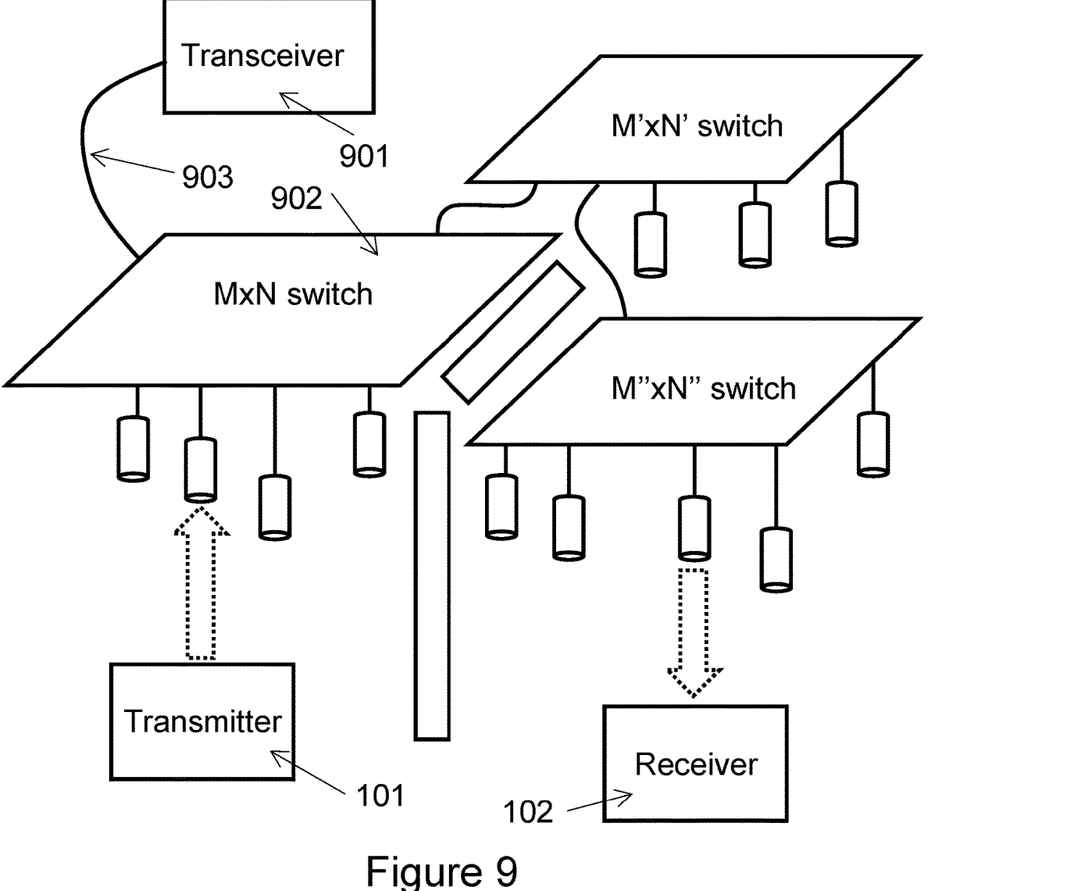

The present embodiments describe the network structure within the devices covered by at least one of the optical couplers that couple free-space optical signals to a waveguide. The network can be connected to a different network as shown in FIG. 9. FIG. 9 contains a similar architecture to the one in FIG. 8 except it has an optical transceiver, 901, connected to one of the optical switches, 902, through a waveguide mean, 903, such as an optical fiber. In addition to the communication among the devices, such as the transmitter, 101, and the receiver, 102, as depicted in FIG. 9, the architecture also allows access for all devices to any network, such as the telecommunication network, through the optical transceiver, 901.

Although the line-of-sight problem is critical for indoor applications, the present invention is not limited to indoor use. For example, a transmitter located outside of a building might want to communicate with a receiver located indoors. One of the nodes of the otherwise indoor network is positioned outdoors to have a clear path to the transmitter so that the optical signal from the transmitter can be coupled into the node, routed within a waveguide medium, and transmitted to the indoor receiver. The examples of outdoor applications include communications between buildings, traffic control system, and satellite communication. Embodiments are configured to function to when a receiver is positioned on a first side of a physical object is isolated from a transmitter positioned on a second side of the physical object, wherein the waveguide medium and/or switch transverse the physical object to allow communication around the physical object.

The present embodiments incur optical power loss due to (i) coupling between free-space beams and waveguide-confined optical signals, (ii) the insertion loss of optical devices such as optical switches and power splitters, and (iii) propagation loss within the waveguide medium. It is important to make sure that the power level of the optical signal at the receiver is high enough to be detected. If necessary, the present invention can further implement optical amplifiers, such as an Erbium-doped fiber amplifier (EDFA), at any waveguide for amplification of the optical power to boost the power level so that the optical signal can be detected at a receiver.

What is claimed is:

1. An indoor optical re-routing device comprising:
    a plurality of fiber collimators spatially separated from one another, the plurality of fiber collimators including a first collimator and a second collimator, the first collimator being positioned in a first space within a structure and the second collimator being positioned in a second space within the structure, where each of the plurality fiber collimators is configured to receive a first optical signal, and each of the plurality of fiber collimators transmits said first optical signal to a first waveguide, or each of the plurality of fiber collimators receives the first optical signal from the first waveguide and outputs a second signal, wherein the first optical signal and the second signal are free-space optical signals;
    a plurality of second waveguides which connect the first waveguide to an optical switch;
    wherein the optical switch has an input and an output, a controller including a first antenna element configured to receive a wireless signal and converts the wireless signal into an electrical signal, and control electronics configured to control a switching state of the optical switch based on said electrical signal;
    a first transmitter that transmits the first optical signal, the first transmitter being positioned within the first space, wherein the optical signal is a free-space optical signal; and
    a first receiver positioned within the second space that receives the second signal, the first transmitter being configured to transmit RF signals to the first receiver to align the first collimator and the first receiver.

2. The optical routing device of claim 1, further comprising a power splitter and a photodiode, wherein the photodiode is configured to convert a portion of the optical signal into the electrical signal.

3. The optical routing device of claim 1, wherein there is at least one waveguided amplifier within said plurality of second waveguides.

4. The optical routing device of claim 1, wherein said plurality of lens elements include a grating coupler.

5. The optical routing device of claim 1, further comprising:
   a motion stage, a motion controller, and a photodiode in proximity of at least one of the plurality of lens element to optically align the at least one of the plurality of lens elements and the optical signal.

6. The optical routing device of claim 5, further comprising:
   a second antenna element connected to the motion controller, the second antenna element being configured to initiate the optical alignment.

7. The optical routing device of claim 5, further comprising:
   second optical switch or a power splitter.

8. The optical routing device of claim 1, wherein at least one of the plurality of waveguides is connected to an optical transceiver.

* * * * *